United States Patent [19]

Massa

[11] Patent Number: 5,030,048
[45] Date of Patent: Jul. 9, 1991

[54] EXPANDABLE TOOL HOLDING DEVICE USING A FUSIBLE ALLOY

[75] Inventor: Ted R. Massa, Latrobe, Pa.

[73] Assignee: Kennametal Inc., Latrobe, Pa.

[21] Appl. No.: 585,447

[22] Filed: Sep. 20, 1990

[51] Int. Cl.$^5$ ............................................. B23B 31/40
[52] U.S. Cl. ................................... 409/234; 279/2 R; 279/2 A; 408/240
[58] Field of Search ............... 409/232, 234; 408/238, 408/239 R, 239 A; 279/1 A, 1 ME, 2 R, 2 A, 4, 9 R; 269/7; 285/381; 403/273; 242/72 R

[56] References Cited

U.S. PATENT DOCUMENTS

| | | | |
|---|---|---|---|
| 3,790,152 | 2/1974 | Parsons | 29/559 |
| 3,989,260 | 11/1976 | Zonkov | 408/240 |
| 4,262,917 | 4/1981 | Ottestad | 279/4 |
| 4,387,906 | 6/1983 | Nicolin | 279/2 |
| 4,629,378 | 12/1986 | Parsons | 409/131 |
| 4,677,792 | 7/1987 | Speidel | 51/168 |

FOREIGN PATENT DOCUMENTS

| | | | |
|---|---|---|---|
| 535905 | 10/1931 | Fed. Rep. of Germany | 269/7 |
| 776848 | 11/1980 | U.S.S.R. | 269/7 |
| 837590 | 6/1981 | U.S.S.R. | 279/2 R |
| 844151 | 7/1981 | U.S.S.R. | 279/2 R |
| 1207642 | 1/1986 | U.S.S.R. | 279/2 A |
| 1220879 | 3/1986 | U.S.S.R. | 279/2 A |

OTHER PUBLICATIONS

Hertel SE-Drill, The Ultimate Performance Drill Brochure.
Schunk, Ultra Precision Hydraulic Chucks/Expanding Arbors Brochure.

Primary Examiner—William Briggs
Attorney, Agent, or Firm—James G. Porcelli

[57] ABSTRACT

An expandable tool holding device for holding a tool or workpiece in which the clamping force is brought about by the solidification and expansion of a fusible alloy. The alloy is contained in an expansion chamber defined in part by a thin-walled, expansion sleeve. The alloy has a low melting point and expands when it solidifies. The pressure caused by expansion of the fusible alloy radially expands the expansion sleeve causing the expansion sleeve to grip the tool or workpiece. To release the tool, the alloy is heated and liquified so that the expansion sleeve returns to an unexpanded condition.

17 Claims, 6 Drawing Sheets

EXPANDABLE TOOL HOLDING DEVICE USING A FUSIBLE ALLOY

BACKGROUND OF THE INVENTION

This invention relates to a holding device for holding a tool or workpiece and more particularly to an expandable tool holding device in which an expansion sleeve is radially expanded to grip a tool or workpiece.

Various types of expandable chucks and arbors are known for clamping a tool on a support member. Known expandable chucks and arbors usually include a thin-walled, expansion sleeve which defines a pressure chamber. A screw and piston arrangement is used to force a fluid into the pressure chamber. The fluid exerts pressure against the thin-walled expansion sleeve causing it to expand radially to grip the tool or workpiece. Examples of these types of devices are shown in U.S. Pat. Nos. 4,387,906 and 4,677,792.

Another type of expandable chuck which is known is the shrink-fit chuck. In a shrink fit chuck, the tool shank is made slightly larger than the opening in the chuck. The chuck is heated to cause expansion of the opening sufficient to permit insertion of the tool. Once the tool is inserted, the chuck is allowed to cool. As the chuck cools, it contracts to grip the tool shank.

Both fluid expandable chucks and shrink fit chucks are able to achieve accurate and repeatable positioning of the tool or workpiece. Additionally, both have excellent gripping capabilities. Shrink-fit chucks also provide excellent rigidity, whereas fluid expandable chucks are only average in this respect. However, both shrink-fit chucks and fluid expandable chucks have significant drawbacks.

Fluid expandable chucks are generally large and cumbersome. Also, they are susceptible to leakage during operation which makes them less reliable than other chucking devices. The primary disadvantage of shrink-fit chucks is that they can be difficult to use. For instance, it is sometimes difficult to remove a tool from the chuck since heating the chuck causes the tool to be heated by conduction as well. Moreover, relatively high temperatures are needed in order to effect sufficient expansion of the chuck to remove the tool.

SUMMARY AND OBJECTS OF THE INVENTION

The present invention overcomes the disadvantages of the prior art expandable chucks by using a fusible alloy to deform the expansion sleeve. The chucking device is extremely compact, very accurate, extremely stiff, has excellent gripping capabilities, and is reliable and relatively easy to use.

The invention includes a tool support member which may be a chuck or an arbor. The tool support member is formed with an annular chamber or reservoir formed in part by a relatively thin expansion sleeve. The expansion chamber is filled with a bismuth alloy which melts at very low temperatures (from below room temperature up to several hundred degrees Fahrenheit) and expands when it solidifies. The expansion of the alloy upon solidification radially expands the expansion sleeve which in turn causes the expansion sleeve to grip the tool with a very high gripping force.

The reservoir geometry, sleeve geometry, and bismuth alloy can all be selected to provide a particular melt temperature, sleeve deformation, and gripping force. The design results in a chuck which is nearly as compact as shrink fit chucks and mill style chucks but which can be activated at much lower temperature than shrink fit chucks. Additionally, there is no risk of fluid leaking during tool operation, like a hydraulic chuck, because the alloy is solid when the chuck is in use. Further, since the expansion chamber is filled with a solid material, the chuck of the present invention has a stiffness which is higher than fluid expansion chucks having the same size envelope. Accuracy and repeatability of tool placement is also excellent.

Based on the foregoing, it is apparent that the primary object of the present invention is to provide a tool holding device which is able to grip a tool or workpiece with a relatively high gripping force and which achieves accurate and repeatable placement of the tool or workpiece.

Another object of the present invention is to provide a tool holding device which is suitable for high speed tooling.

Another object of the present invention is to provide a tool holding device which has above average strength and stiffness.

Another object of the present invention is to provide a tool holding device which is reliable and avoids frequent breakdowns or failures.

Another object of the present invention is to provide a tool holding device which is contained in a compact envelope.

Another object of the present invention is to provide a tool holding device which is relatively easy to use.

DETAILED DESCRIPTION OF THE INVENTION

Figure 1:
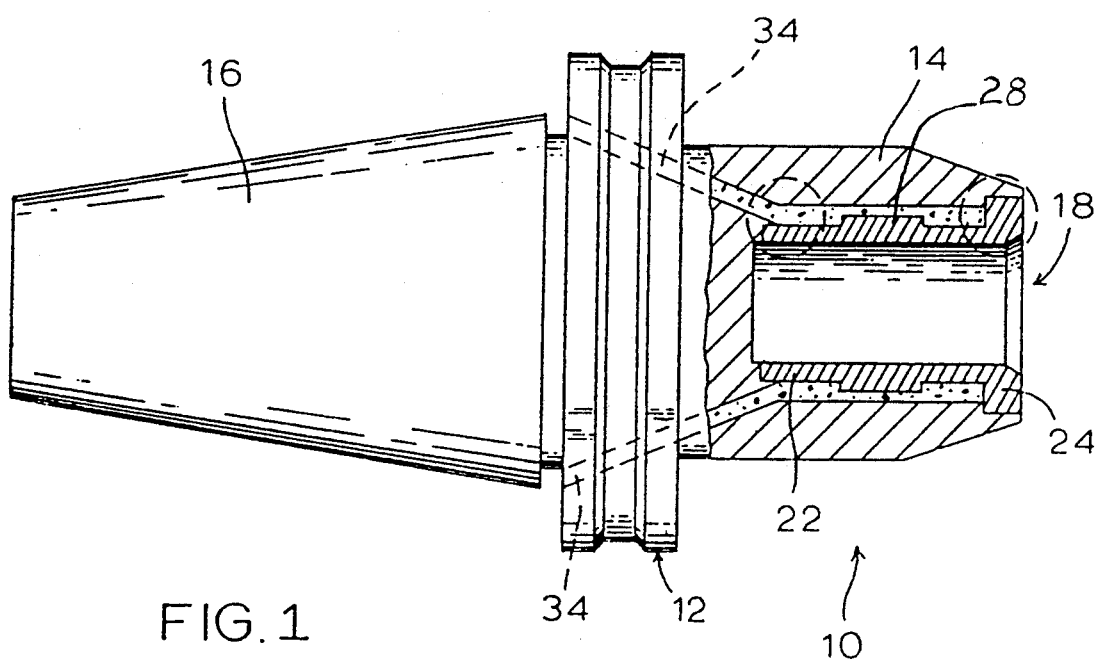
FIG. 1 shows an expandable chuck in axial, part sectional view.

Referring now to FIG. 1 a preferred embodiment of the present invention is shown therein and indicated generally by the numeral 10. The invention includes a tool support member 12 in the form of a chuck having a forward section 14 and a tapered rear section 16. The tapered rear section 16 is adapted to mount to the spindle of a machine tool. The forward section 14 is formed with an axial bore 18 which is adapted to receive the shank of a tool or a tool holder (not shown). A recessed flange seat 20 is formed at the forward end of the axial bore 18. A thin-walled expansion sleeve 22 having a flange 24 is mounted inside the axial bore 18 with the flange 24 seating in the flange seat 20 of the chuck body 12. The expansion sleeve 22 extends along a substantial portion of the axial bore 18. An annular expansion chamber 30 is formed in the forward section 14 between the expansion sleeve 22 and the chuck body 12. In other words, the expansion sleeve 22 forms one wall of the expansion chamber 30.

Figure 1B:
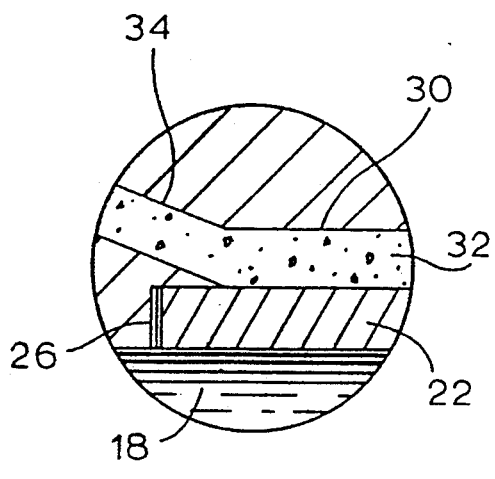
FIG. 1B is an enlargement of a portion of FIG. 1 illustrating how the expansion sleeve is mounted.
Figure 1A:
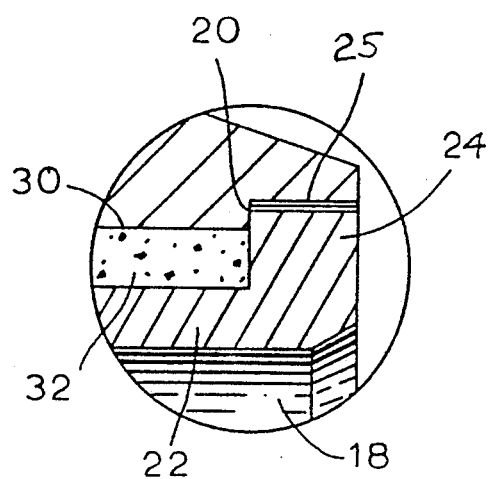
FIG. 1A is an enlargement of a portion of FIG. 1 illustrating how the expansion sleeve is mounted.

As shown best in FIGS. 1A and 1B, the expansion sleeve 22 is fixedly secured in the axial bore 18. A preferred means of securement is by welding the expansion sleeve 22 to the chuck body 12. In FIGS. 1A and 1B, the numbers 25 and 26 indicate the weld used to secure the expansion sleeve 22 to the chuck body 12. One weld 25 is made along the periphery of the flange as seen in FIG. 1A. The other weld 26 is made where the distal end of the expansion sleeve 22 meets the chuck 12. Electron beam welding is preferred because it provides a narrow and very deep weld. Alternatively, the expansion sleeve 22 can be laser welded or brazed.

The expansion sleeve 22 may include one or more raised sections. The embodiment shown includes a single raised section 28 which extends around the center of the expansion sleeve 22. The raised section 28 of the expansion sleeve 22 will cause the sleeve 22 to assume a non-uniform curvature when the sleeve 22 is expanded so that the sleeve 22 will grip the tool at two spaced apart locations.

The expansion chamber 30 is filled with a fusible material which expands when it solidifies. A suitable material having this unusual property is a bismuth alloy. Generally speaking, bismuth alloys have very low melting points which may range from ambient temperatures to several hundred degrees Fahrenheit. The present invention uses a bismuth alloy from Indium Corporation of America called "Indalloy 158". The alloy contains 50% bismuth, 26.7% lead, 13.3% tin and 10% cadmium. The alloy has a melting point of 158° F. and is eutectic.

The expansion chamber 30 is filled through two angled fill holes 34. One angled fill hole 34 is connected to a vacuum pump via a stop-cock valve (not shown). The other angled fill hole is connected to an external reservoir containing the Bismuth alloy. The alloy must be heated during filling to maintain the alloy in a liquid state.

To fill the expansion chamber 30, the stop cock valve connected to the vacuum pump to evacuate the expansion chamber 30. Once the expansion chamber 30 is evacuated, the stop-cock valve connected to the external reservoir is opened and the alloy 32 is drawn into the expansion chamber 30 by the vacuum. When the expansion chamber 30 is completely filled, plugs (not shown) are inserted into the fill holes, and welded in place. Alternatively, threaded plugs could be used which simply screw into the ends of the fill holes 34.

Upon solidification, the bismuth alloy 32 undergoes a volumetric expansion of approximately 1.7%. Due to the elongated configuration of the expansion chamber 30, the expansion of the alloy 32 occurs almost totally in the radial direction. The expansion of the alloy 32 causes the expansion sleeve to expand radially inwardly to grip the shank of a tool or a tool holder. When the alloy 32 is heated to a temperature above 158°, the alloy liquifies. The alloy takes up less volume in a liquid state thus allowing the expansion sleeve 22 to resiliently return to an unexpanded condition.

There are numerous methods available for heating the chuck 12. For instance, the present invention may be carried out using resistance heaters, induction heaters, hot water coils, or any other heating method. The particular method used is not critical. The chuck 12 can be cooled by conduction, air, water or other means.

Figure 2A:
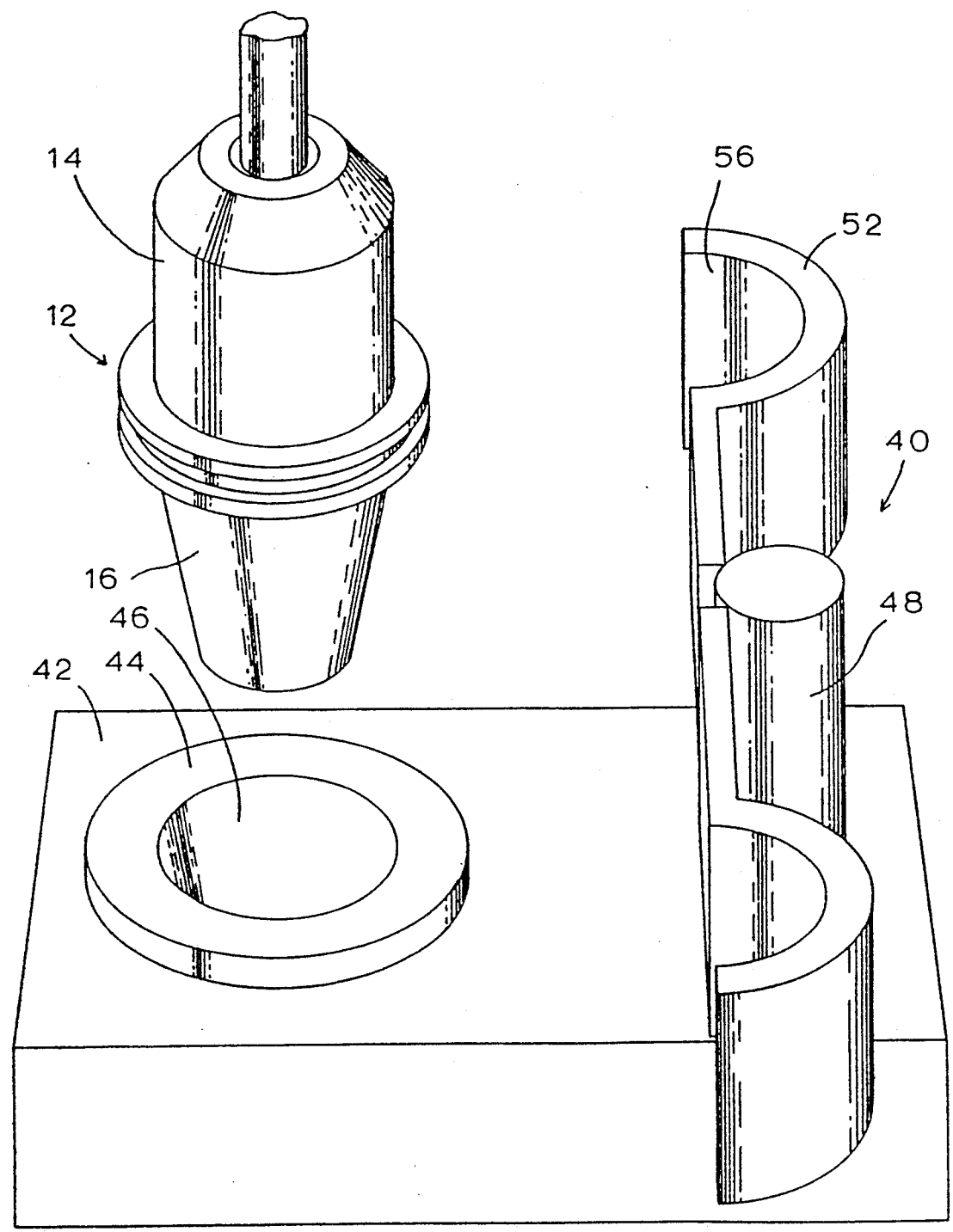
FIG. 2A is a perspective view of a tool set-up assembly.
Figure 2B:
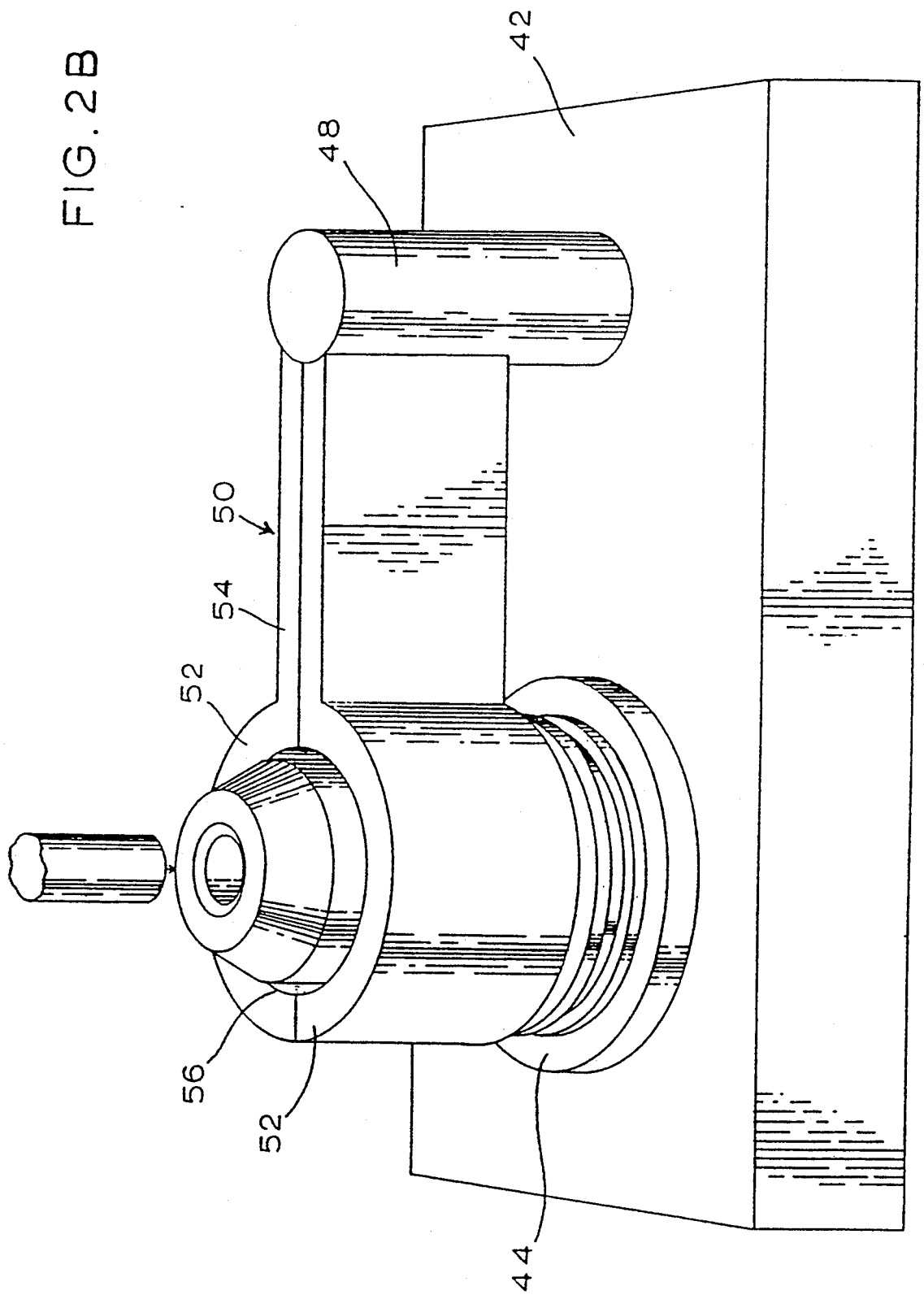
FIG. 2B is a perspective view of the tool set-up assembly with the chuck of the present invention mounted thereon.

In FIGS. 2A and 2B, a tool set-up assembly 40 is shown which employs a resistance-type heating element. The tool set-up assembly 40 includes a base 42 with a tool support collar 44 mounted thereon. The tool support collar 44 has a tapered, tool-receiving opening 46 into which the rear end 16 of the chuck 12 can be inserted.

Mounted to the base adjacent the collar 44 is a support post 48. The support post 48 supports a heater assembly indicated generally 50. The heater assembly 50 includes two half cylinders or split rings 52 and two support arms 54. The split rings 52 and support arms 54 preferably contained an insulating material which may be a ceramic or heat resistant plastic or foam. Suitable materials include silicone rubber, Mylar, Kapton, and Teflon.

The split rings 52 each contain a heating element 56 for heating the chuck. The heating element 56 in the preferred embodiment is a resistance element. In the embodiment shown, the resistance element is a thin foil made of a resistive nickel alloy which is 80% nickel and 20% chrome. The foil is applied to the inner surface of the split rings 52. Current is applied to the resistance elements by conductors (not shown) which pass through a hollow space in the post 48.

Figure 3A:
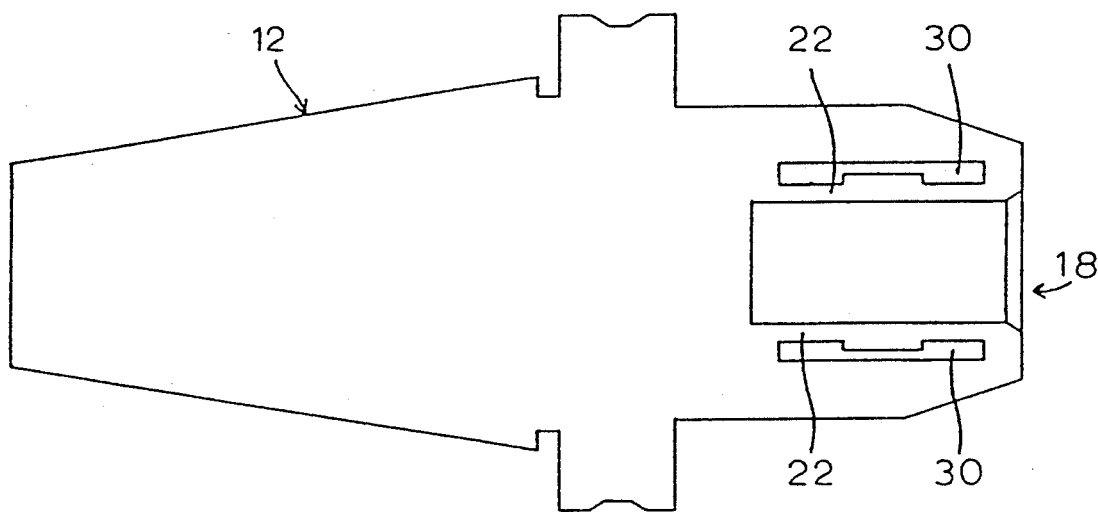
FIGS. 3A-3D are schematic representations of the expandable chuck illustrating its operation.

To heat the chuck body 12, the heating assembly is opened, as shown in FIG. 2A, and the chuck body 12 is inserted into the collar 44. The heating assembly 50 is then closed, as shown in FIG. 2B, and current is applied to the heating elements. Preferably, the amount of current applied should be sufficient to heat the chuck body and melt the alloy in approximately 15 seconds. Once the alloy melts, the expansion sleeve 22 assumes an unexpanded condition as shown in FIG. 3A. The tool can then be inserted into the chuck body 12.

Figure 3B:
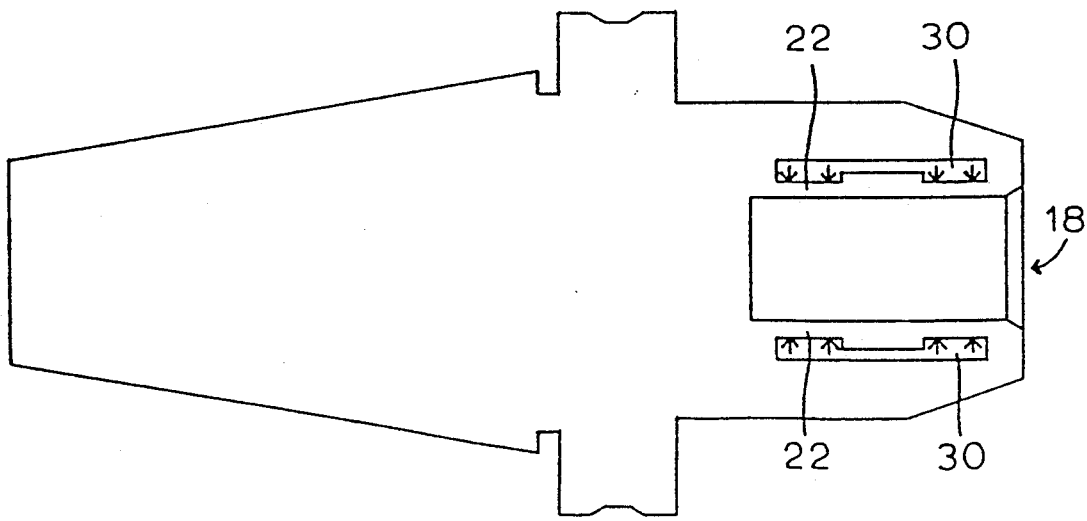
Figure 3C:
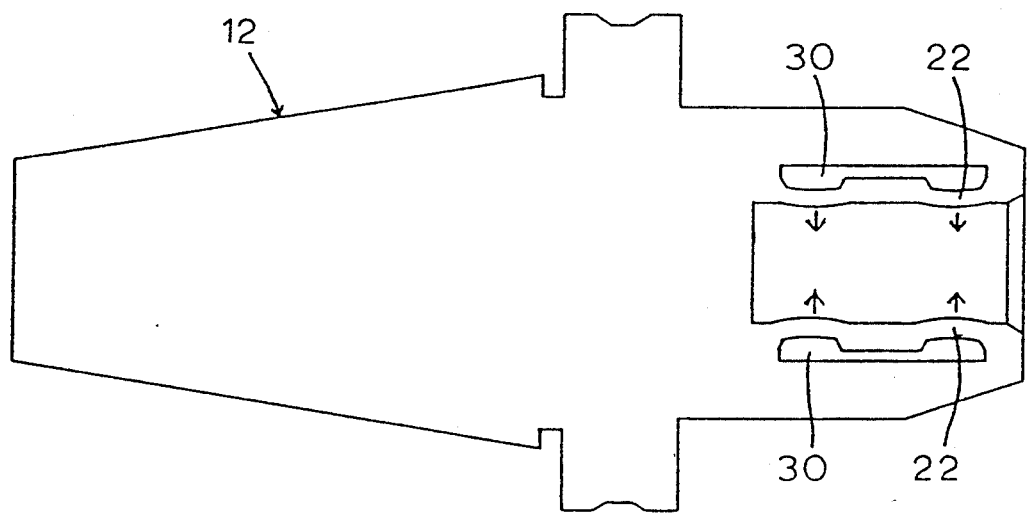

After inserting the tool, the current is shut off. Because of the relatively large surface area of the foil-type resistance element, the resistance element will air cool in a very short period of time. Also, because the alloy 32 is eutectic, it will solidify rapidly once the temperature reaches the melting point. As the alloy 32 solidifies it undergoes expansion, primarily in the radial direction. Thus, a force is exerted against the expansion sleeve as shown in FIG. 3B. The solidification of the alloy thus causes the expansion sleeve 22 to expand radially inwardly as shown in FIG. 3C.

Figure 3D:
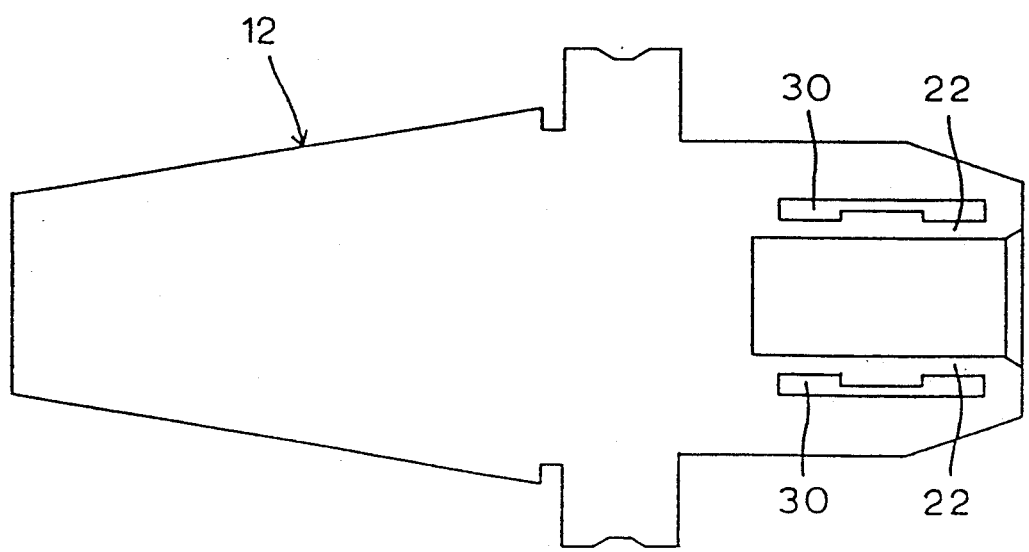

When the alloy is reheated, the expansion sleeve 22 again returns to an unexpanded condition as shown in FIG. 3D. In the preferred embodiment of the invention, the greatest expansion of the sleeve 22 occurs at two axially spaced locations due to the reinforcement at the center of the expansion sleeve 22. As a result, the tool will be gripped at two axially spaced locations. Without the reinforcement at the center of the expansion sleeve 22, the sleeve 22 would tend to bow inwardly with the greatest expansion occurring near the center. Thus, the tool would be gripped primarily at a single location and would therefore have a tendency to wobble. By designing the expansion sleeve 22 to grip the tool at two axially-spaced locations, the tool is gripped tightly without any tendency to wobble.

The expansion chamber geometry, sleeve geometry and bismuth alloy can all be selected to provide a particular melt temperature, sleeve deformation and gripping force. The sleeve deformation, gripping force and heat input required to activate chuck has been calculated for a chuck having the following dimensions:

| | |
|---|---|
| inside diameter of sleeve | 1.25 inches |
| outside diameter of sleeve | 1.40 inches |
| outside diameter of reservoir | 1.70 inches |
| outside diameter of chuck | 2.30 inches |
| length of chuck | 2.00 inches |

Without a tool in the chuck, the inside diameter of the sleeve will expand inwardly 0.0026 inches. The outside diameter of the chuck body will expand 0.0016 inches. Obviously, these values can be changed by altering the relative sizes of the sleeve and expansion chamber. The grip force on the tool, assuming that the tool has a diameter equal to the "free" diameter of a sleeve, would be approximately 38,000 lbs/in$^2$. For the 1.25" diameter tool in a two inch long sleeve, the total grip force on the tool would be 299,000 lbs. The power required, assuming no radiation, conduction or convection losses, to heat the chuck body to 158° F. and to melt the alloy in a 15 second time period would be approximately 1584 watts.

Figure 4:
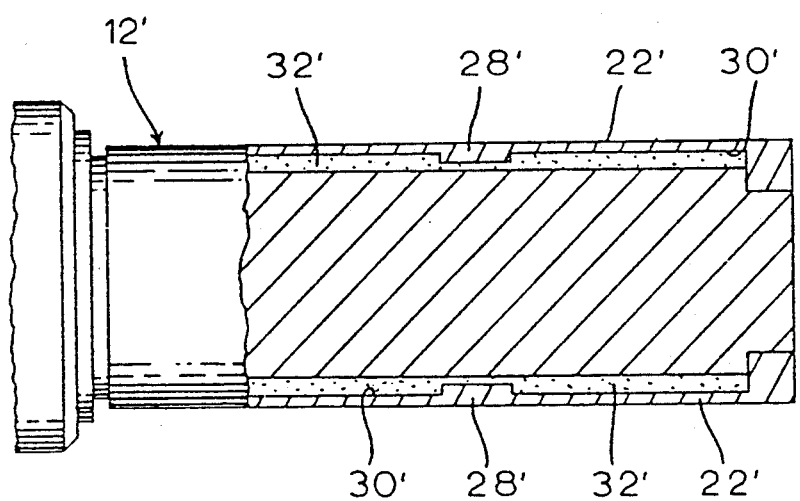
FIG. 4 shows an expandable arbor in axial, part sectional view.

Referring now to FIG. 4, a second embodiment of the present invention is shown therein. The second embodiment includes a support member in the form of an arbor 12'. An expansion sleeve 22' extends circumferentially around the arbor 12' and defines an expansion chamber 30' between the arbor 12' and sleeve 22'. As in the first embodiment, the sleeve 22' is fixedly secured to the arbor 12' by weldment and defines an expansion chambers 30' between the arbor 12' and expansion sleeve 22'. The expansion chamber 30' is also filled with a Bismuth alloy 32' in the same manner as previously described.

The expandable arbor functions in the same way as the expandable chuck of the first embodiment. When the alloy 32' solidifies, the expansion sleeve 22' is expanded radially outwardly to engage the tool or workpiece. As in the first embodiment, the expansion sleeve 22' includes a raised section 28' so that the expansion sleeve 22' grips the tool or workpiece at two axially spaced locations.

The present invention has many advantages over prior art expandable chucks. Unlike fluid expandable chucks, there is no danger of the fluid leaking during tool operation since the alloy is solid. Further, because the alloy is solid the chuck is extremely rigid. In contrast to shrink fit chucks, the chuck of the present invention is far easier to use since the tool can be released at relatively low temperatures.

In comparison to fluid expandable chucks and shrink fit chucks, the present invention has all of their advantages. The present invention is capable of accurate and repeatable positioning of the tool or workpiece. Additionally, the gripping ability of the present invention is excellent. Thus, the present invention exploits the advantages of prior art expandable chucks while avoiding their disadvantages.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An expandable tool holding device comprising:
   a) a tool support member;
   b) a radially expandable sleeve mounted on the tool support member;
   c) an expansion chamber defined between the tool support member and the expansion sleeve containing a fusible material which expands when it solidifies;
   d) wherein upon solidification of the fusible material, the expansion sleeve is expanded radially to clamp the tool mounted on the tool support member; and
   e) wherein upon liquification of the fusible material, the expansion sleeve returns to an unexpanded condition to release the tool.

2. The expandable tool holding device according to claim 1 wherein the tool support member comprises a chuck having an axially extending bore and wherein the expansion sleeve is disposed within the axial bore and expands radially inwardly to engage the tool.

3. The expandable tool holding device according to claim 1 wherein the tool support member comprises an arbor and wherein the expansion sleeve extends circumferentially around the arbor and expands radially outwardly to engage the tool.

4. The expandable tool holding device according to claim 1 wherein the fusible material is a bismuth alloy.

5. The expandable tool holding device according to claim 4 wherein the fusible material solidifies and melts at a temperature below 300° Fahrenheit.

6. The expandable tool holding device according to claim 5 wherein the fusible material solidifies and melts at a temperature between approximately 140° and 180° Fahrenheit.

7. An expandable tool holding device comprising:
   a) a tool support member;
   b) a resilient expansion sleeve mounted on the tool support member, the expansion sleeve having a relatively thin-wall which expands under pressure, said thin-wall including one or more thickened portions;
   c) an annular expansion chamber defined between the expansion sleeve and the tool support member;
   d) a fusible alloy which expands when it solidifies contained within the expansion chamber so as to substantially fill the expansion chamber when the fusible alloy is in a liquid state;
   e) wherein the expansion sleeve expands radially to engage the tool upon solidification of the fusible alloy; and
   f) wherein the expansion sleeve resiliently returns to its unexpanded condition to release the tool when the fusible alloy melts.

8. The expandable tool holding device according to claim 7 wherein the tool support member comprises a chuck having an axially extending bore and wherein the expansion sleeve is disposed within the axial bore and expands radially inwardly to engage the tool.

9. The expandable tool holding device according to claim 7 wherein the tool support member comprises an arbor and wherein the expansion sleeves extends circumferentially around the arbor and expands radially outwardly to engage the tool.

10. The expandable tool holding device according to claim 7 wherein the fusible alloy is a Bismuth alloy.

11. The expandable tool holding device according to claim 10 wherein the fusible alloy solidifies and melts at a temperature below 300° Fahrenheit.

12. The expandable tool holding device according to claim 11 wherein the fusible alloy solidifies and melts at a temperature between approximately 140° and 180° Fahrenheit.

13. A method for securing and releasing a tool or workpiece on an expandable tool holding device having a tool support member, a resilient expansion sleeve, and an expansion chamber defined between the tool support member and the expansion sleeve comprising:
   a) filling the expansion chamber with a fusible material while the fusible material is in a liquid state the material having the property of expanding when it solidifies;
   b) inserting the tool onto the tool holding device while the fusible material is in a liquid state;
   c) cooling the fusible material sufficient to solidify the material and expand the expansion sleeve; where upon the expansion sleeve grips the tool or workpiece; and
   d) heating the fusible material to melt the fusible material and allow the expansion sleeve to return to an unexpanded condition thereby releasing the tool or workpiece.

14. The method according to claim 13 wherein the fusible material is a Bismuth alloy.

15. The method according to claim 14 wherein the fusible material solidifies and melts at a temperature in the range of 120° to 200° Fahrenheit.

16. The method according to claim 13 wherein the expansion sleeves expands radially outwardly to engage an inner surface of the tool or workpiece.

17. The method according to claim 13 wherein the expansion sleeve expands radially inwardly to engage an outer surface of the tool or workpiece.

* * * * *